Figure 1:
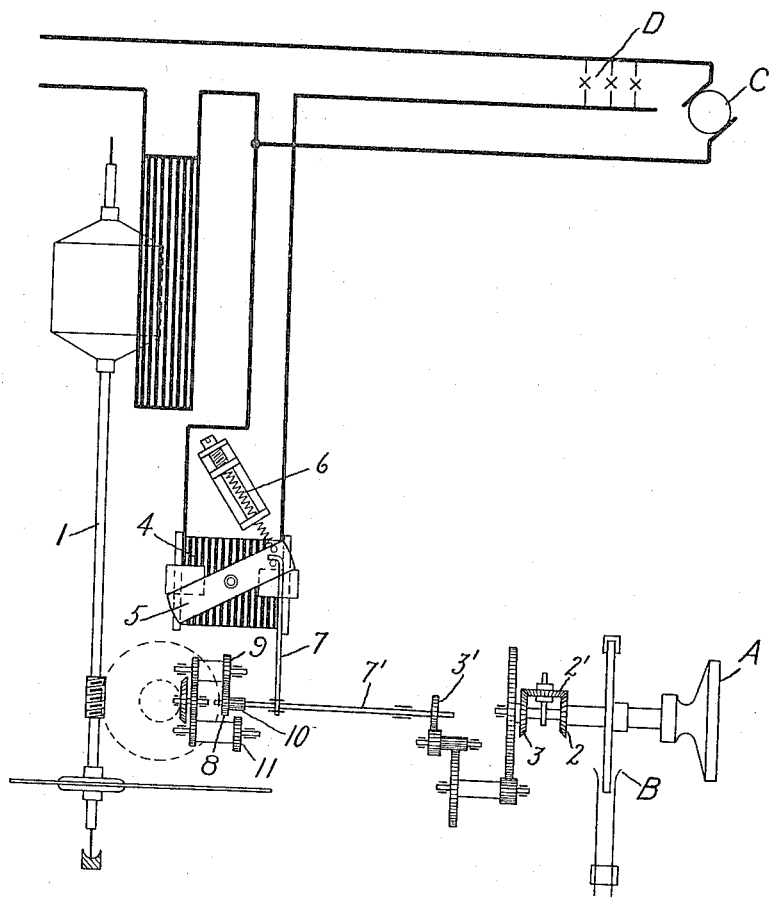

M. HELM.
ELECTRIC METER.
APPLICATION FILED MAY 24, 1912.

1,157,937.

Patented Oct. 26, 1915.
2 SHEETS—SHEET 2.

WITNESSES:
J. Earl Ryan
J. Ellis Ela

INVENTOR:
MAX HELM,
BY Albert G. Davis
HIS ATTORNEY.

UNITED STATES PATENT OFFICE

MAX HELM, OF PANKOW, GERMANY, ASSIGNOR TO GENERAL ELECTRIC COMPANY, A CORPORATION OF NEW YORK.

ELECTRIC METER.

1,157,937.     Specification of Letters Patent.     Patented Oct. 26, 1915.

Application filed May 24, 1912. Serial No. 699,481.

*To all whom it may concern:*

Be it known that I, MAX HELM, a subject of the Emperor of Germany, residing at Pankow, Germany, have invented certain new and useful Improvements in Electric Meters, of which the following is a specification.

My invention relates to electric meters, and particularly to multiple-rate electric meters, and still more particularly to prepayment electric meters. Although my invention relates especially to electric meters the principle of my invention can be employed in connection with meters for gas, water or other purposes.

The object of my invention is to provide a construction of meter which will automatically control the amount of energy metered or delivered for a certain coin-value, according as the energy being consumed is for power purposes, or for lighting purposes, or for both.

A further object of my invention is to provide in combination with an electric meter operatively related to a plurality of load circuits means including a demand device for changing the rate of registration of the meter when the demand of one of the load circuits undergoes a predetermined change.

It is convenient and customary to speak of the amount of energy metered or delivered for a coin-unit, or a certain coin-value, as the "unit value" of the meter. The purpose of my invention is, therefore, to so control the unit-value of the meter that it will be automatically increased or decreased in accordance with predetermined conditions of consumption.

The load curve of the ordinary central station shows that the demand for electricity is greatest during the evening hours of the day. This is of course due to the fact that the consumption of electricity for lighting purposes during these hours is very great. It is desirable to reduce the consumption of electricity for power purposes to as small an amount as possible during the period of maximum consumption for lighting purposes. I propose to accomplish this result by so metering the electricity consumed for both power and lighting purposes that the consumer will be induced to take no energy for power purposes when he is using energy for lighting purposes.

I provide one meter for regulating the consumption of electricity for both power and lighting purposes. When no energy is being consumed for lighting purposes the meter operates at a certain unit value, that is, a certain definite quantity of electricity is metered or delivered for a coin-unit. When, however, energy is being consumed for lighting purposes the unit value of the meter is automatically decreased, and a smaller quantity of electricity is metered or delivered for the same coin-unit. The consumer is of course always at liberty to take energy for both purposes, but since he receives a smaller quantity of electricity for the same coin-unit when any energy is being consumed for lighting purposes he is induced to use little or no energy for power purposes at the time he is using energy for lighting purposes.

For a better understanding of my invention in its application to a prepayment-electric meter, reference is to be had to the accompanying drawings, wherein—

Figure 2:
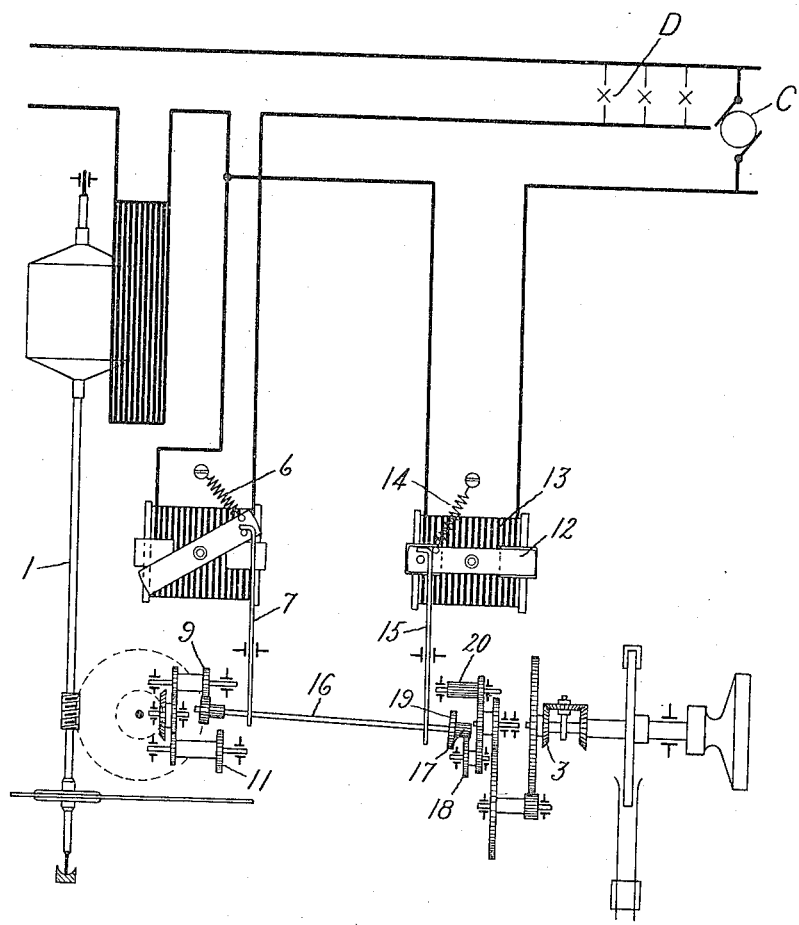

Figure 1 shows diagrammatically one construction of meter involving the novel features of my invention; and Fig. 2 is a modification thereof.

In Fig. 1 of the drawings, there is shown an electric motor meter of any preferred construction having a rotary shaft 1. In operative relation with this shaft, as will be more fully described, is a differential gearing comprising the side gear members 2 and 3 and the planetary gear 2'. A knob A is connected to the planetary gear 2' in the well known manner, and upon the introduction of a coin and the turning of the knob one-half of a revolution, the switch B is closed and the gear 2 rotated one revolution. The gear 3 is rotated by the shaft 1, through intermediate gearing, and operates to turn the gear 2 in a reverse direction so as to open the switch when a certain quantity of electricity has been metered. These features embody a well known type of prepayment meter and form no part of my invention.

A power load and a lighting load is illustrated at C and D respectively. The current taken by the lighting load flows through the coil of an electromagnet 4, which thus constitutes the current responsive element of a demand device. In coöperation with the electromagnet is a pivoted armature 5, normally held in the position shown in the figure by a spring 6. A bar 7 connects the armature to a shaft 7′. One end of this shaft carries a gear 3′ which is always connected through a suitable train of gearing to the gear 3 of the differential. The other end of the shaft 7′ carries two gears 8 and 10 of different dimensions, and is adapted to be swung through a small angle by the connecting bar 7 under the influence of the armature 5.

Normally, the gear 8 is in mesh with a gear 9, due to the action of the spring 6 upon the armature 5 and bar 7. When the armature is energized the gears 8 and 9 are disengaged and the bar 7 pushes the gear 10 into mesh with a gear 11. The gears 9 and 11 are connected through intermediate and similar gearing to the meter shaft 1, so that a rotation of the latter is communicated to each of these gears. Both gears operate to turn the shaft 7′ in the same direction, but since gear 10 is smaller than gear 8, the shaft will rotate more rapidly, for a uniform rotation of the meter shaft, when gears 10 and 11 are in mesh. The unit value of the meter is, therefore, smaller when gears 10 and 11 are engaged than it is when gears 8 and 9 are engaged. This change in the unit value of the meter is effected by the current flowing in the lighting circuit, and it is evident that by a suitable adjustment of the spring 6, the change can be effected when any current, however small, is used for lighting purposes, or when the current used for this purpose exceeds a certain predetermined value.

In Fig. 2 I have shown a demand device comprising an electromagnet and coöperating armature in both the lighting and power circuits. The parts in coöperation with the electromagnet of the lighting circuit are identical with those described in connection with Fig. 1 and are represented by the same reference characters. In Fig. 2 the bar 7 is connected near one end of a shaft 16, both of whose ends are adapted to be swung through a small angle. Near the other end of the shaft 16 is connected a bar 15 coöperating with the armature 12 of the electromagnet 13 which is energized by the current of the power circuit. A spring 14 is connected to the armature and tends normally, through the bar 15, to hold a gear 19, on the shaft 16, in engagement with a gear 20. The shaft 16 carries a second and smaller gear 17 which is pushed into engagement with a gear 18 when the armature 12 is attracted by its electromagnet, the gears 19 and 20 being at the same time disengaged. The gears 18 and 20 are, through suitable and similar gearing, connected to the gear 3 of the differential gearing.

The spring 14 can be so tensioned that the armature 12 will be attracted by its electromagnet when any current is being used for power purposes, or only when current is used for power purposes in excess of a certain predetermined quantity. When the gears 17 and 18 are in mesh, the unit value of the meter is smaller than when the gears 19 and 20 are in mesh, and the change of the unit value is dependent upon the current conditions of the power circuit. By the use of a demand device such as an electromagnet in both the lighting and power circuits it is possible to provide the meter with a plurality of unit values, and the change in unit value of the meter can be effected upon change in current conditions in either the lighting or power circuits or both.

What I claim as new and desire to secure by Letters Patent of the United States, is,—

1. The combination with an electric meter, of a plurality of load circuits, and means independent of the motive elements of the meter for changing the unit value of the meter with respect to the energy supplied to both of said circuits when the electrical condition of one of the circuits undergoes a predetermined change.

2. The combination with a plurality of load circuits, of an electric meter adapted to meter at the same unit value the total combined amount of energy simultaneously supplied to said circuits, and means independent of the motive elements of the meter for changing the unit value of the meter with respect to the energy supplied to both of said circuits when the electrical condition of one of said circuits undergoes a predetermined change.

3. The combination with an electric meter, of a power circuit and a lighting circuit, and means independent of the motive elements of the meter for changing the unit value of the meter with respect to the energy supplied to both of said circuits when the electrical condition of the lighting circuit undergoes a predetermined change.

4. The combination with a plurality of load circuits, of an electric meter adapted to meter at the same unit value the total combined amount of energy simultaneously supplied to said circuits, and a demand device operatively included in one of said circuits and adapted when the electrical condition of said circuit undergoes a predetermined change to alter the unit value of the meter with respect to the energy supplied to both of said circuits.

5. The combination with a power circuit and a lighting circuit, of an electric meter adapted to meter at the same unit value the total combined amount of energy simultaneously supplied to said circuits, and means independent of the motive elements of the meter for changing the unit value of the meter with respect to the energy supplied to both of said circuits when the current in the lighting circuit exceeds a predetermined value.

6. The combination with a plurality of load circuits, of an electric meter adapted to meter at the same unit value the total combined amount of energy simultaneously supplied to said circuits, and means independent of the motive elements of the meter for changing the unit value of the meter with respect to the energy supplied to both of said circuits when the electrical condition of either one of said circuits undergoes a predetermined change.

7. The combination with an electric meter adapted to operate at a plurality of unit values, of a plurality of load circuits, a demand device in each of said circuits and responsive to changes in the electrical condition of the circuits for changing the unit value of the meter when the electrical condition of any circuit undergoes a predetermined change.

8. The combination with a plurality of load circuits, of an electric meter adapted to meter at the same unit value the total combined amount of energy simultaneously supplied to said circuits, a device operatively related to one of said circuits and responsive to changes in the electrical condition of said circuit, and means in operative relation to said device for changing the unit value of the meter with respect to the energy supplied to both of said circuits when the electrical condition of the circuit to which the device is operatively related undergoes a predetermined change.

9. The combination with an electric meter adapted to operate at a plurality of unit values, of a plurality of load circuits, an electromagnet in each of said circuits, armatures for said electromagnets, and means in operative relation with said armatures for controlling the unit value at which the meter operates in accordance with the electrical condition prevailing in said circuits.

10. The combination with an electric meter adapted to operate at a plurality of unit values, of a power circuit and a lighting circuit, a demand device in said power circuit for changing the unit value of the meter when the current in the power circuit exceeds a predetermined value, and a second demand device in said lighting circuit for changing the unit value of the meter when the current in the lighting circuit exceeds a predetermined value.

11. The combination with an electric meter adapted to operate at a plurality of unit values, of a power circuit and a lighting circuit, a current responsive device in said power circuit, means operatively related to said current responsive device for changing the unit value of the meter when the current in the power circuit exceeds a predetermined value, a second current responsive device in said lighting circuit, and means in operative relation with said second current responsive device for changing the unit value of the meter when the current in the lighting circuit exceeds a predetermined value.

In witness whereof, I have hereunto set my hand this first day of May, 1912.

MAX HELM.

Witnesses:
JOSEPH FIRELL,
HENRY HASPER.

Copies of this patent may be obtained for five cents each, by addressing the "Commissioner of Patents, Washington, D. C."